United States Patent
Bevc et al.

(10) Patent No.: US 8,429,222 B2
(45) Date of Patent: Apr. 23, 2013

(54) REMOTE ACCESS AND AUTOMATED DIALOG BUILDING FOR REMOTE PROCESSING

(75) Inventors: Dimitri Bevc, Pleasanton, CA (US); Ovidiu Feodorov, Mountain View, CA (US); Biondo Biondi, Stanford, CA (US); Alexander M Popovici, Portola Valley, CA (US)

(73) Assignee: 3DGEO Inc., Santa Clara, CA (US)

( * ) Notice: Subject to any disclaimer, the term of this patent is extended or adjusted under 35 U.S.C. 154(b) by 2181 days.

(21) Appl. No.: 10/315,752

(22) Filed: Dec. 9, 2002

(65) Prior Publication Data

US 2003/0078931 A1    Apr. 24, 2003

Related U.S. Application Data

(63) Continuation of application No. 09/705,039, filed on Nov. 1, 2000, now Pat. No. 6,493,635.

(60) Provisional application No. 60/162,985, filed on Nov. 1, 1999.

(51) Int. Cl.
*G06F 15/16* (2006.01)

(52) U.S. Cl.
USPC .......................................................... 709/203

(58) Field of Classification Search ................... 709/203
See application file for complete search history.

(56) References Cited

U.S. PATENT DOCUMENTS

| | | | |
|---|---|---|---|
| 4,564,900 A * | 1/1986 | Smitt ............................ 709/212 |
| 5,301,309 A * | 4/1994 | Sugano ........................... 714/12 |
| 5,873,049 A | 2/1999 | Bielak et al. |
| 5,875,333 A | 2/1999 | Fish et al. |
| 5,920,828 A * | 7/1999 | Norris et al. ..................... 702/14 |
| 5,930,512 A * | 7/1999 | Boden et al. .................. 717/102 |
| 5,956,036 A | 9/1999 | Glaser et al. |
| 5,974,256 A | 10/1999 | Matthews et al. |
| 5,987,125 A | 11/1999 | Stringer et al. |
| 6,021,198 A | 2/2000 | Anigbogu et al. |
| 6,041,330 A * | 3/2000 | Carman et al. ....................... 1/1 |
| 6,061,516 A | 5/2000 | Yoshikawa et al. |
| 6,113,649 A | 9/2000 | Govindaraj |
| 6,138,150 A | 10/2000 | Nichols et al. |
| 6,167,433 A | 12/2000 | Maples et al. |
| 6,216,169 B1 | 4/2001 | Booman et al. |
| 6,247,015 B1 * | 6/2001 | Baumgartner et al. ............... 1/1 |
| 6,253,369 B1 * | 6/2001 | Cloud et al. .................. 717/136 |
| 6,269,475 B1 | 7/2001 | Farrell et al. |
| 6,304,260 B1 * | 10/2001 | Wills ........................... 715/853 |

(Continued)

*Primary Examiner* — Alicia Baturay
(74) *Attorney, Agent, or Firm* — Dorsey & Whitney LLP

(57) ABSTRACT

Geophysical data processing is remotely controlled and monitored over a wide-area network such as the Internet. A customer using a client computer builds geophysical data processing flows (concatenations of geophysical data processing modules or filters) and enters parameter values required for flow execution. The flow descriptions and associated parameter values are then transferred from the client to a geophysical data processing server, for example a parallel supercomputer. The flows (jobs) are executed on the server, typically over periods ranging from hours to weeks. Intermediate or partial results are made available to the customer for visualization before the processing of a flow is complete. The customer can then modify the flow before its complete execution. Data-entry windows are automatically generated for geophysical processing modules by parsing the source code of the modules. The automatic generation of data-entry windows allows relatively simple integration of new seismic interpretation packages with a given graphical user interface.

26 Claims, 8 Drawing Sheets

U.S. PATENT DOCUMENTS

| | | | |
|---|---|---|---|
| 6,317,137 B1 | 11/2001 | Rosasco | 345/467 |
| 6,317,838 B1 | 11/2001 | Baize | |
| 6,470,388 B1 * | 10/2002 | Niemi et al. | 709/224 |
| 6,510,411 B1 * | 1/2003 | Norton et al. | 704/254 |
| 6,557,024 B1 * | 4/2003 | Saito et al. | 709/201 |
| 6,578,090 B1 * | 6/2003 | Motoyama et al. | 719/315 |
| 6,587,833 B1 * | 7/2003 | Ruffin et al. | 705/11 |

* cited by examiner

Bandpass

Required  Typical  All esize  n1
n2  n3
nphi  nplo
phase
d1  fhi
flo

[OK]  [Apply]  [Cancel]

ToClient

Required  Typical  All

Display (y/n):
filename:  [filetree]

[OK]  [Apply]  [Cancel]

FIG. 5-B

REMOTE ACCESS AND AUTOMATED DIALOG BUILDING FOR REMOTE PROCESSING

RELATED APPLICATION DATA

This application is a continuation of U.S. patent application Ser. No. 09/705,039, filed Nov. 1, 2000, which claims the priority date of U.S. Provisional Patent Application No. 60/162,985, filed Nov. 1, 1999, both of which are herein incorporated by reference.

COPYRIGHT AND TRADEMARK NOTICE

This disclosure contains material which is subject to copyright protection. The copyright owner, 3DGeo Development Inc., has no objection to the facsimile reproduction by anyone of the patent disclosure, as it appears in the Patent and Trademark Office patent file or records of any country, but otherwise reserves all rights whatsoever 3DGeo and INSP are trademarks of 3DGeo Development, Inc. Sun and Java are trademarks of Sun Microsystems, Inc. Other products and services are trademarks of their respective owners.

BACKGROUND

This invention relates to geophysical data processing, communication over wide area networks and graphical user interfaces, and in particular to systems and methods providing remote access and automated dialog-building for geophysical data processing applications.

Computer-intensive processing of reflection seismic data is the main tool for imaging the Earth's subsurface to identify hydrocarbon reservoirs and determine rock and fluid properties. Seismic data is recorded at the earth's surface or in wells, and an accurate model of the underlying geologic structure is constructed by processing the data. In the past decade, 3-D seismic processing has shown far superior cost-effectiveness than conventional 2-D seismic processing. However, the reconstruction of accurate 3-D images of the subsurface requires the handling of a huge amount of seismic data (on the order of terabytes for a single modern marine 3-D survey) and the application of computer-intensive imaging algorithms. Even today, only large-scale parallel computers can image modern marine surveys with the most sophisticated algorithms within a useful turn-around time. Indeed, the use of large-scale parallel computers for seismic processing has achieved such technical and economical success that the geophysical market accounts for the largest commercial market for scientific high-performance computing.

Unfortunately, many exploration organizations have no direct access to high-end seismic imaging technologies because they lack the resources to acquire and maintain the necessary hardware and software. The cost of the required computing and data-storage facilities is still quite high, although it keeps going down. However, in perspective, even more problematic is the large investment in application development and system maintenance that the effective use of these computational facilities requires. These costs are not decreasing, they are actually increasing with the level of complexity and sophistication of the imaging applications. Many existing commercial packages are targeted to run effectively on workstations, not on large parallel systems, and thus are ineffective for the high-end applications. As a result, only the central processing departments of large oil companies (e.g. Exxon-Mobil, Shell, BP-Amoco) can afford to employ large-scale parallel computers for imaging 3-D seismic data. The rest of the exploration industry outsources large 3-D seismic imaging projects to outside service companies (e.g. Schlumberger, Western Geophysical).

According to this outsourcing model, the data are physically sent on tape to the service companies, who process the data with little input from the oil companies, and then deliver the final images after several months. This service model has been historically successful for exploring areas with relatively simple geology, but it has proven inadequate for exploring areas with complex geology, where most of the still undiscovered hydrocarbon reservoirs are yet to be found. In such areas, the data must often be imaged by applying 3-D prestack depth migration, instead of simpler and more traditional time imaging procedures. Depth imaging is potentially much more accurate than time imaging, but it is also less robust with respect to some of the processing parameters. In particular, depth imaging needs an accurate interval velocity function to properly focus the reflections. Because the velocity function cannot be uniquely determined from the data alone, a priori geological information must be taken into account, and the final results are greatly enhanced when geologists work closely with the processing team. However, in the typical interaction between service companies and oil companies, the geologist cannot be involved in the processing because of the physical distance and the difficulties caused by the old traditional service model.

SUMMARY

According to one aspect, the present invention provides systems and methods allowing remote access/control of geophysical data processing servers over wide area networks. In particular, the present invention provides systems and methods allowing remote evaluation of intermediate (partial) results of geophysical data processing, and remote cessation of the processing if the intermediate results are not satisfactory. According to another aspect, the present invention provides systems and methods allowing the automatic generation of user data-entry (dialog) displays for geophysical data processing modules by parsing at least part of the source code of the modules.

The present invention provides a computer-implemented geophysical data processing method comprising the steps of: automatically determining a user data-entry requirement for a geophysical data processing module, by parsing an input source file for the module; generating a user data-entry display (e.g. a window) according to the data-entry requirement, for requesting a set of input parameter values from a user; accepting the set of input parameter values from the user; and employing the module to process a geophysical data set using the set of input parameter values.

The present invention also provides a computer-implemented geophysical data processing method comprising the steps of: establishing a geophysical data processing flow on a geophysical data processing server, the data processing flow generating an intermediate result of geophysical data processing performed on a geophysical data set; and accessing the intermediate result from a client connected to the server over a wide-area network, for evaluating the intermediate result.

The present invention further provides a computer-implemented client geophysical data processing method comprising the steps of: generating a display of a geophysical data processing workgroup, the workgroup including a set of projects and a set of geophysical data processing modules, each project including at least one geophysical data set and at least one geophysical data processing flow, the at least one processing flow including a concatenation of geophysical data processing modules; in response to a user selection of the at least one flow from the display of the workgroup, generating a display of the concatenation of data processing modules of the at least one processing flow; in response to a set of flow editing user commands, modifying the flow; after the modifying, sending a description of the flow to a geophysical data processing server over a wide area network; accepting from a user a set of parameter values for at least one module of the flow; sending the set of parameter values to the server over the wide area network; directing an execution of the flow on the server, the execution employing the set of parameter values; and retrieving a result of the execution for visualization.

DESCRIPTION OF THE FIGURES

FIG. 4-B illustrates a flow-builder display according to an alternative embodiment of the present invention.

DETAILED DESCRIPTION

In the following description, a set of elements is understood to comprise one or more elements. The term panel is understood to encompass entire display windows and parts of display windows. It is understood that results and other data structures can be generated and/or stored in system memory and/or in files. Geophysical data is understood to encompass recorded as well as synthetic data. Unless otherwise characterized, geophysical data processing is understood to broadly encompass any transformation, generation, visualization, use or accessing of geophysical data. A wide area network is understood to mean a network including at least one router. An input source file of a module is understood to be a file including part or all of the source code of the module.

The following description illustrates embodiments of the invention by way of example and not necessarily by way of limitation. While the following discussion focuses on Unix and Java, it will be clear to the skilled artisan that other platforms and languages are suitable for use with the present invention.

Figure 1:
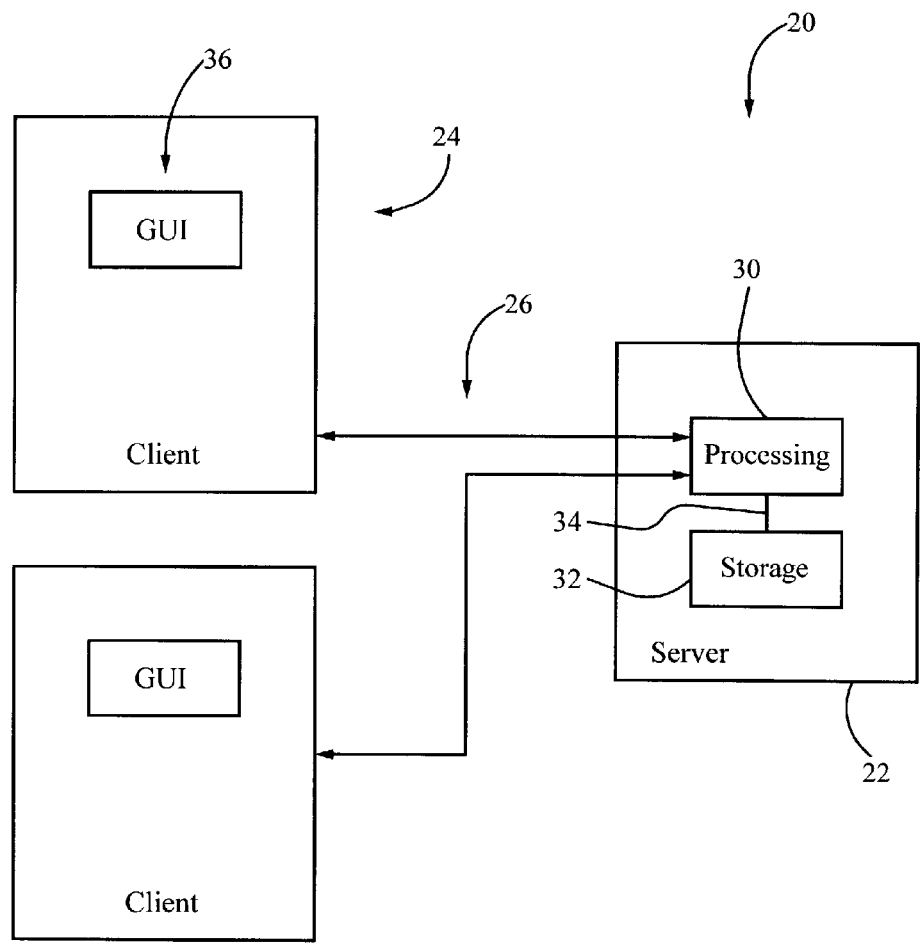
FIG. 1 is a schematic diagram illustrating a preferred seismic processing system of the present invention.

FIG. 1-A shows a schematic overview of the preferred hardware of a geophysical data processing system 20 of the present invention. System 20 comprises a server subsystem 22 and a plurality of client subsystems 24. Each client subsystem 24 is connected to server subsystem 22 over a control and interpretation (analysis) link 26. Client subsystems 24 can be located far away (for example within a different building or company) than server subsystem 22. In a typical application, client subsystems 24 are located at client oil companies, while server subsystem 22 is located at a geophysical processing service company providing services to multiple oil companies. Control and interpretation link 26 is preferably implemented over a wide area network such as the Internet.

Server subsystem 22 preferably comprises a processing unit 30 and a data storage device 32. Processing unit 30 can include an integrated parallel computer such as an Origin 2000 from SGI or Enterprise from Sun Microsystems. Processing unit 30 can also include a cluster of interconnected computers, such as for example a Beowulf Linux cluster forming a parallel computer. Data storage device 32 includes an array of tape and/or hard disk drives capable of storing geophysical data sets—on the order of hundreds of gigabytes to tens of terabytes of data. Processing unit 30 is connected to data storage device 32 over a data link 34. Processing unit 30 and storage device 32 are preferably located within the same physical facility, and can be implemented on the same computer system. Data link 34 can have a higher-bandwidth than control/interpretation link 26, and can be implemented over a local area network (LAN).

Each client subsystem 24 can be implemented using a personal computer or workstation with less storage and/or computational capability than server subsystem 22. Each client subsystem 24 includes display and input devices (e.g. monitor and keyboard) for control, data entry, and data visualization. In particular, each client subsystem includes a graphical user interface (GUI) 36 of the present invention. Different client subsystems 24 may have different operating systems (platforms). GUI 36 is preferably implemented in a platform-independent language such as Java. In the presently preferred implementation, GUI 36 is run as an applet, although in general GUI 36 can be provided as an installed program. Both server 22 and client 24 preferably have the Java Runtime Environment (JRE) installed thereon.

Figure 2:
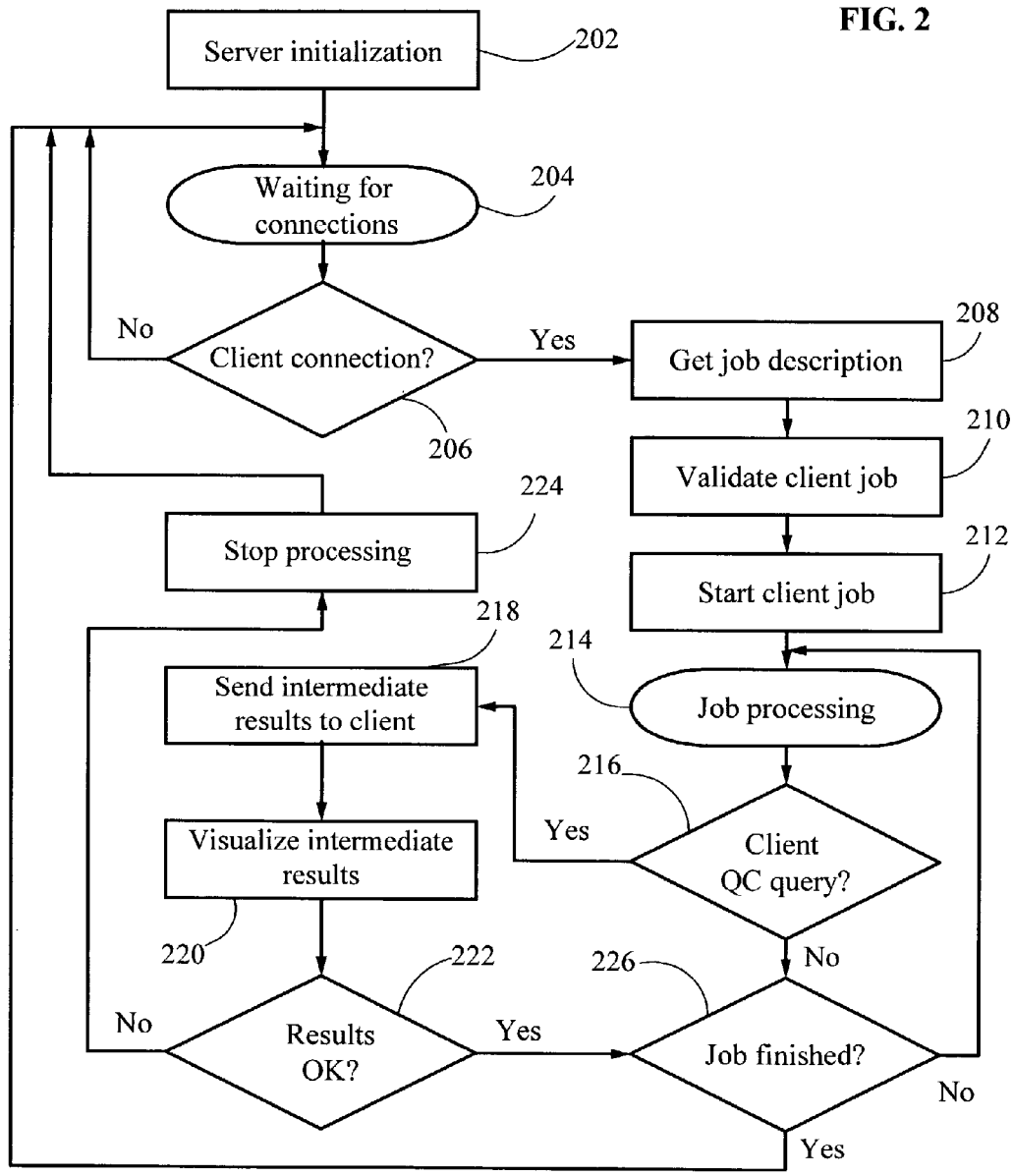
FIG. 2 is a flowchart showing steps performed by a server in the preferred embodiment present invention.

FIG. 2 is a flowchart showing steps performed by server subsystem 22 in the preferred embodiment of the present invention. The process starts at step 202 with the initialization of server subsystem 22. In step 204, server 22 waits for client connections. If a connection with a client 24 is established (step 206), server 22 receives a geophysical processing job description from client 24 (step 208), and validates and starts the job (steps 210, 212). The job comprises applying a concatenation of geophysical processing modules (modules) to an input geophysical data set, and generating a result including an output geophysical data set. The job description includes an ordered list of the processing modules forming the job, as well as a list of parameters used in the job. Validating the job (step 210) can include checking that the modules listed in the job description are available on server 22 for use the by that customer, and that parameter values received from client 24 are valid.

In step 214, server 22 executes the job. During the job processing, geophysical processing intermediate (partial) results can be created in the computer memory and/or an output file. The intermediate results are generated by the last module in the concatenation forming the job. The intermediate result can be a 3-D array (grid) of geophysical data such as velocity, amplitude, or traveltime data. The intermediate result is repeatedly updated during the job processing. The size of the intermediate result can be on the same order of magnitude as the input and output geophysical data sets.

Upon a quality-control (QC) query by client 24 (step 216), server 22 reads and transfers a requested part or all of the intermediate results to client 24 (step 218). The requested part of the intermediate result may include for example sample 2-D data slices from a 3-D array. In step 220, client 24 is used by an end user, typically a geophysicist, to visualize the intermediate result. If the intermediate result is deemed unsatisfactory (step 222), the user can use client 24 to stop the execution of the job on server 22 (step 224), change parameters for the job, and re-start the execution of the job (steps 204-214). If the intermediate result is satisfactory and the geophysical processing job is not finished (step 226), server 22 continues the processing (step 214). If the job is finished, server 22 returns to waiting for client connections for accepting a new job.

The job processing may employ conventional geophysical processing modules (filters) known in the art. Such modules can implement velocity estimation, traveltime computation, and migration algorithms, among others. Source code and executable files for each module are stored and/or executed on server 22.

Server 22 further stores data on authorized users and workgroups. A workgroup generally corresponds to a set of users who have access to common objects (modules, project, data, and flow files) stored on server 22. Typically, a workgroup corresponds to a given customer company or a group within a given company. Once logged-in, a user who is a member of a workgroup can access the objects that are licensed to the workgroup, and can create new projects.

Each workgroup contains a set of modules and a set of projects, preferably organized as a tree structure, as described in further detail below. Each module represents a seismic processing executable, and can be used to build processing flows (jobs). Each module has a set of associated parameters, and values for these parameters can be edited by including the module in a workflow and then using the Module Editor. A new module can be added to the hierarchy of the existing modules only by the INSP administrator. Each project includes a set of data files and a set of flow (processing) files. Each project can contain recursively an arbitrary number of sub-projects, which have a similar structure. A project (or sub-project) can be created dynamically by any member of the workgroup.

A flow is a collection of instantiated modules, ordered in a sequence selected by the client user as described in more detail below with reference to FIG. 4-A, and having associated values for module parameters and input geophysical data set(s). Flow attributes can include: flow name, name of the project to which the flow belongs, LoginID of the flow author, flow creation date, comments, list of module names for the modules contained in the flow, and list of parameter values for each module in the flow.

Server 22 can further store a global module configuration file and a set of module display customization files. The global configuration file can be replaced by a table stored in a database. Each module display customization file corresponds to a given module. The module configuration file contains a table establishing a correspondence between each module name and the location(s) of the module source code and display customization file corresponding to the module. Each customization file contains descriptive data for the corresponding module's parameters. Parameter descriptive data can include physical units, default values, parameter grouping and ordering information, and text for describing the parameters to users.

Figure 3:
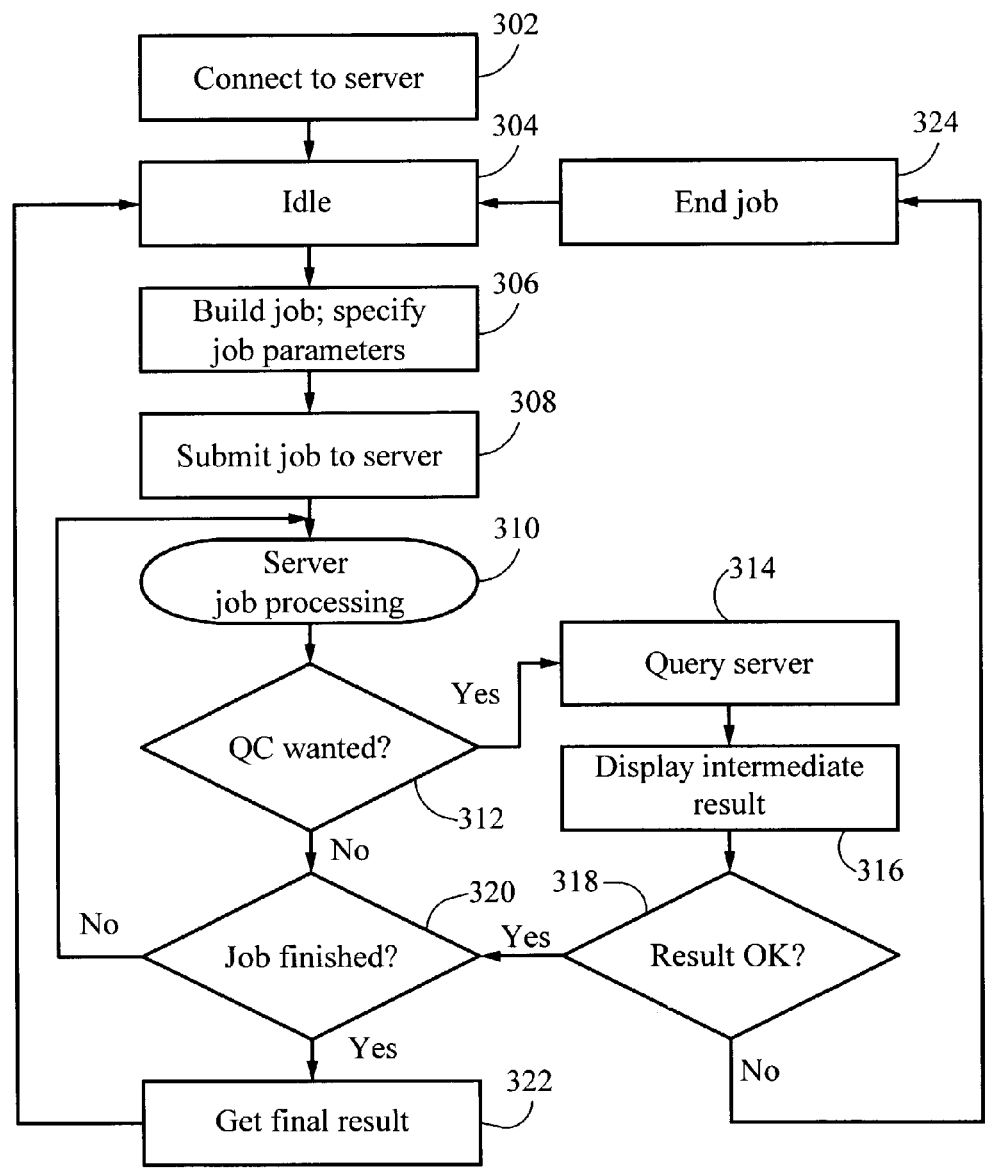
FIG. 3 is a flowchart illustrating steps performed by a client in the preferred embodiment of the present invention.

FIG. 3 is a flowchart illustrating the steps performed by a client 24 in the preferred embodiment of the present invention. In step 302, client 24 logs in to server 22. Client 24 is then idle, waiting for user input (step 304). In step 306, client 24 builds a desired geophysical processing job (flow) as described in more detail below with reference to FIG. 4-A. Referring back to FIG. 3, client 24 then submits the job to server 22 (step 308). While server 22 processes the job (step 310), client 24 can send quality-control queries to server 22 (steps 312, 314). If a QC query is desired, server 22 is queried, and an intermediate result is received and displayed by client 24 (step 316). If the intermediate result is judged to be satisfactory (step 318) and the current job is not finished, processing continues at step 310. Client 24 can then request more intermediate results. If the job is finished, a final result is retrieved from server 22 and the client process ends (step 322). The final result can then be visualized using client 24. If an intermediate result is judged to be unsatisfactory by an end user, the end user can use client 24 to stop the further execution of the job by server 22 (step 324).

Figure 4:
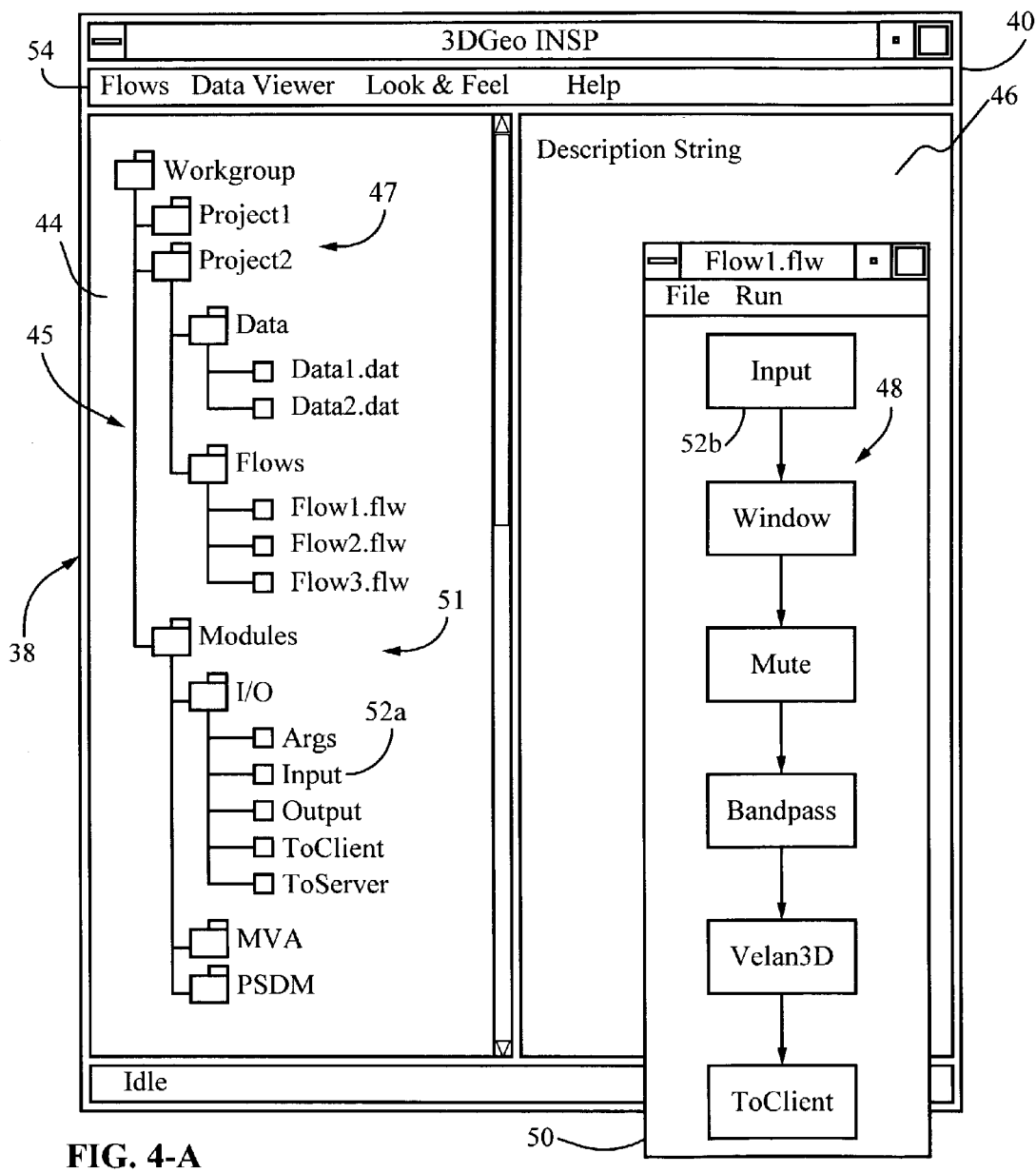
FIG. 4-A shows an exemplary flow-builder display according to the preferred embodiment of the present invention.

FIG. 4-A shows a graphical user interface display 38 display corresponding to the job-building step 306 illustrated in FIG. 3, for an arbitrary exemplary job (flow) 48 according to the presently preferred embodiment of the present invention. Display 38 comprises a directory (workgroup) window 40 and at least one flow-builder window 50. Flow builder window 50 graphically illustrates flow 48. Window 40 comprises a directory panel 44 and an information panel 46. Directory panel 44 displays a tree structure representation 45 of a workgroup corresponding to the particular customer using display 38. Information panel 46 displays predefined information on each object of the workgroup when the user clicks on that object.

Representation 45 includes representations of the components of the workgroup arranged as a tree structure. The workgroup includes a plurality of projects 47 and a set of geophysical data processing modules 51. Modules 51 can include subsets (folders) of modules, each including geophysical data processing modules available for use in that workgroup. Modules 51 can be grouped in functional categories such as Input/Output (I/O), Migration Velocity Analysis (MVA), and Pre-Stack Depth Migration (PSDM). Each project 47 includes a set of geophysical data files and a set of flow (job) descriptions.

When a user clicks on a representation of flow 48 in directory panel 44, client 24 opens flow builder window 50 corresponding to flow 48. Flow builder window 50 displays a representation of the concatenation of geophysical data processing modules forming flow 48. The user can add modules by dragging and dropping module representations from directory panel 44 into flow builder window 50, or by clicking on module representations in directory panel 44 and selecting each module for addition to flow 48. For example, to add an Input module to flow 48, the user can click on the Input module representation 52*a* in directory panel 44 and drag the representation to flow builder window 50. The Input module is then added to the flow, and flow builder window 50 displays a representation 52*b* of the Input module. Similarly, the user can add subsequent modules Window, Mute, Bandpass, Velad3D, and ToClient to flow 48 by operating on the module representations in directory panel 44. The modules cited above are illustrated for exemplary purposes only. Many other modules are known in the geophysical processing art. The user can also delete and move modules within flow builder window 50. The user can enter desired parameter values for each represented module, as described in detail below with reference to FIGS. 5-A and 5-B. Once flow 48 has been built, the user can commence its execution on server 22 by selecting a Run command in flow builder window 50.

The Input module is used to specify the filename containing the geophysical data set to be processed. Each subsequent module performs an operation on its input. For example, the Window module operates on the geophysical data set specified by the Input module, and the Mute module operates on the result produced by the Window module. The ToClient module sends the final result to the specified client.

FIG. 4-B shows an alternative graphical user interface display 138 corresponding to the job-building step 306 illustrated in FIG. 3. Referring to FIG. 4-B, display 138 comprises a flow-builder window 140 including a flow builder panel 144 and a module (directory) panel 146. Flow panel 144 graphically illustrates a flow 148 under construction, while module panel 146 graphically illustrates a plurality of modules 150 available for constructing flow 148. Module panel 146 groups modules 150 in subpanels according to the function of the modules contained in each subpanel. To construct flow 148, the user clicks on the Input module button 152a situated in module panel 146. Client 24 then displays the Input module representation 152b in flow panel 144. The user then sequentially clicks on the Window, Mute, Bandpass, Velad3D, and ToClient buttons in module panel 146, which are sequentially arranged in flow panel 144 in descending order.

Generally, display 138 can include additional panels/windows than the ones illustrated in FIG. 4-B. For example, a module caching panel can be used to display the modules most often used by a particular user, or the latest modules used by the user. Display 138 can further include a data entry panel for allowing the user to enter data required by each module 50. In the presently preferred embodiment, a data-entry window separate from window 140 is generated for each module 150 for which data entry is requested, as explained below with reference to FIGS. 5-A and 5-B.

Figure 5:
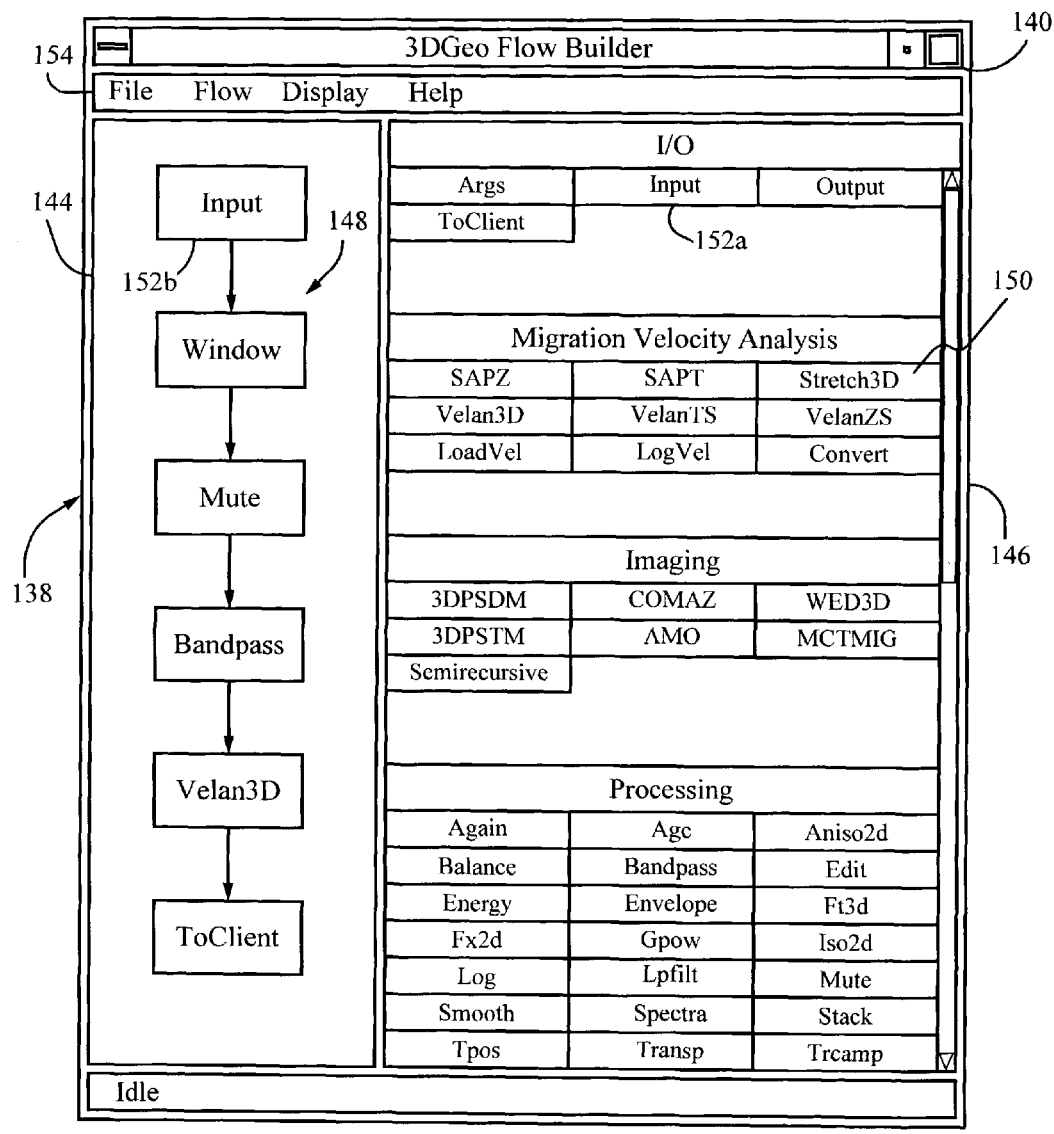
FIGS. 5-A and 5-B show exemplary data-entry displays for two geophysical processing modules according to the preferred embodiment of the present invention.

FIGS. 5-A and 5-B show exemplary data-entry windows 60a-b for two arbitrary modules, Bandpass and ToClient. Each of windows 60a-b contains plural data entry display fields. Each field corresponds to an input parameter that the corresponding module requires the user to enter. The data-entry fields can be grouped according to the type of input parameter to be entered: integer, float, character, string, or Boolean. As shown, window 60a comprises integer data-entry fields 62 and float entry fields 64, while window 60b comprises a character data entry field 66 and a string data entry field 68. The data-entry fields can also be grouped according to their functionality or according to whether they are required or typical (not required). The user enters the requested input parameters into each window 60a-b, and when finished clicks on an OK button 69 displayed in the window. By default, each window 60a-b only requires the entry of a subset of the total number of parameters that can be entered by the user. A user can choose to enter values for other parameters, up to the total number of parameters available.

Each data-entry window 60a-b is preferably automatically generated using a data entry builder vector (object) obtained by parsing at least part of the source code of the corresponding module. The data entry builder vector defines a user data-entry requirement for the module. The data entry builder vector includes a list of parameter names, types, and any additional characteristics needed for data entry. Such additional characteristics are stored in the customization file corresponding to the module, and can include parameter measurement units, descriptions, and minimum and maximum acceptable values, among others.

Figure 6:
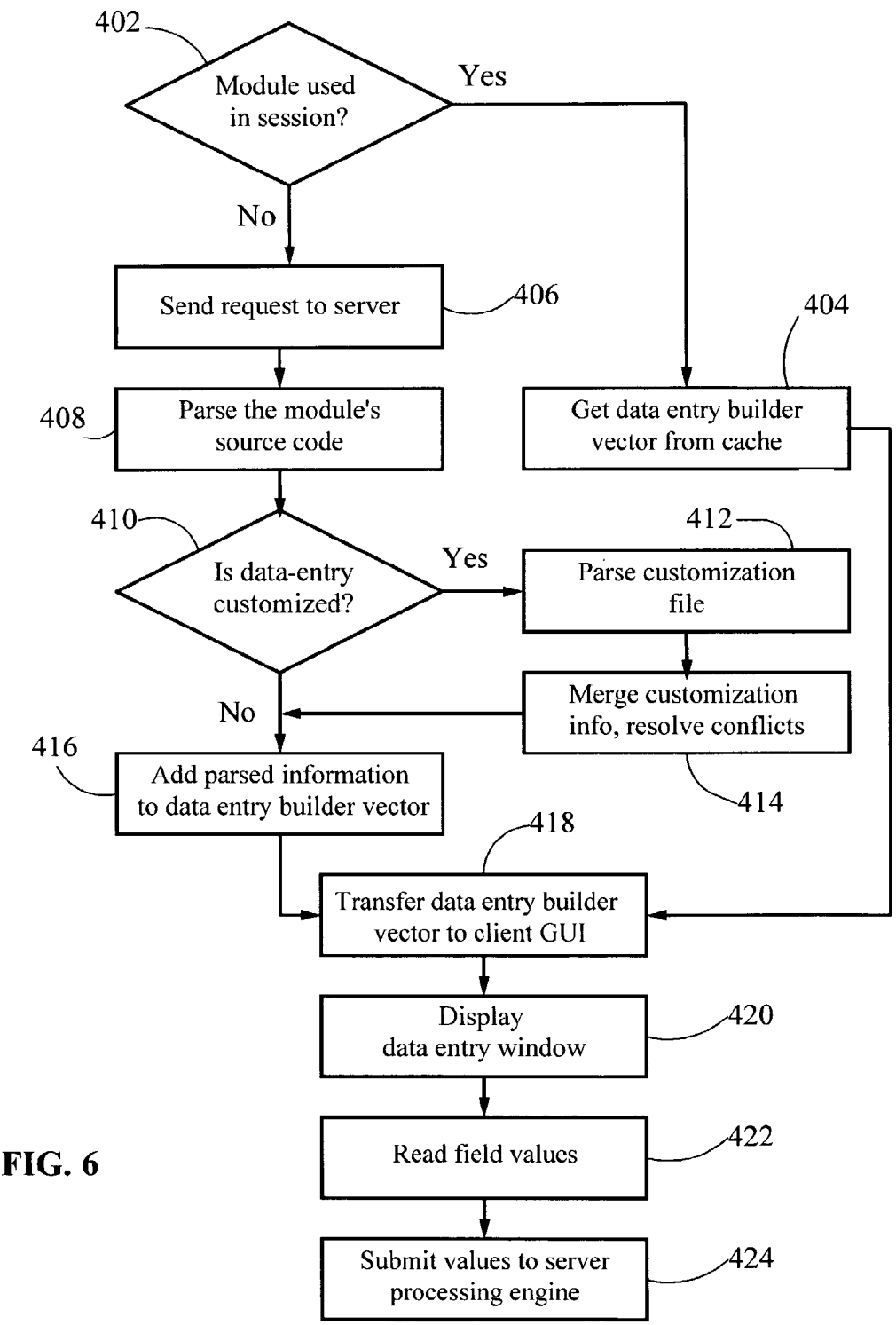
FIG. 6 illustrates in detail steps performed to automatically generate data-entry windows for each module in the preferred embodiment of the present invention.

FIG. 6 illustrates the preferred steps performed by system 20 for building data-entry windows such as those shown in FIGS. 5-A and 5-B. Once a user adds a module to a flow, client 24 checks whether the module has been used in the same session (step 402). If the module has been used in the same session, the data entry builder vector required for building the corresponding data entry window is available in a local cache. The data entry builder vector is then retrieved from the local cache (step 404). In step 406, if the module has not been used in the same session, client 24 makes a request to server 22 for the data entry builder vector required to build a user data entry display for that module.

To automatically generate the data entry builder vector, server 22 first parses an input source file for the module (step 408). The input source file includes at least part of the source code for the corresponding module. The input source file can include the entire source code of the module. Generally, the input source file need only include only those parts (e.g. files) of the source code containing function calls for data entry.

In step 408, the parser finds the first occurrence of each user data entry reference on a line. The data entry references are function calls for reading parameter values. In the presently-preferred Java implementation, the parser seeks the first occurrence of one of the keywords getch, fetch, hetch, and getpar on each line. In other implementations other keywords may indicate parameter requirements. Each line containing a user data entry reference is then in turn parsed to determine the names and types of input parameters referenced in the line, and the process continues for subsequent lines of code.

After the module source code is parsed, server 22 checks whether the data-entry window is to be customized (step 410). Customization of the data-entry window can require values for parameter characteristics other than name and type. If the data-entry window is to be customized, a customization (configuration) file corresponding to the module is parsed to determine relevant configuration parameters (step 412). After parsing the customization file, server 22 reconciles the results of the module source code parsing and the customization file parsing (step 414). In step 416, any additional parameter characteristics or attributes generated by parsing the customization file (steps 412 and 414) are added to the data entry builder vector generated in step 408.

In step 418, the resulting data entry builder vector is transferred to the GUI of client 24. In step 420, client 24 employs the data entry builder vector to construct a data-entry window such as those illustrated in FIGS. 5-A and 5-B. The user enters parameter values (step 422) and then activates a validation control such as the "OK" button in FIG. 5-A. The input parameter values entered by the user are transferred to server 22 (step 424), which in turn employs the input parameter values in the data processing performed by the modules forming a job.

Figure 7:
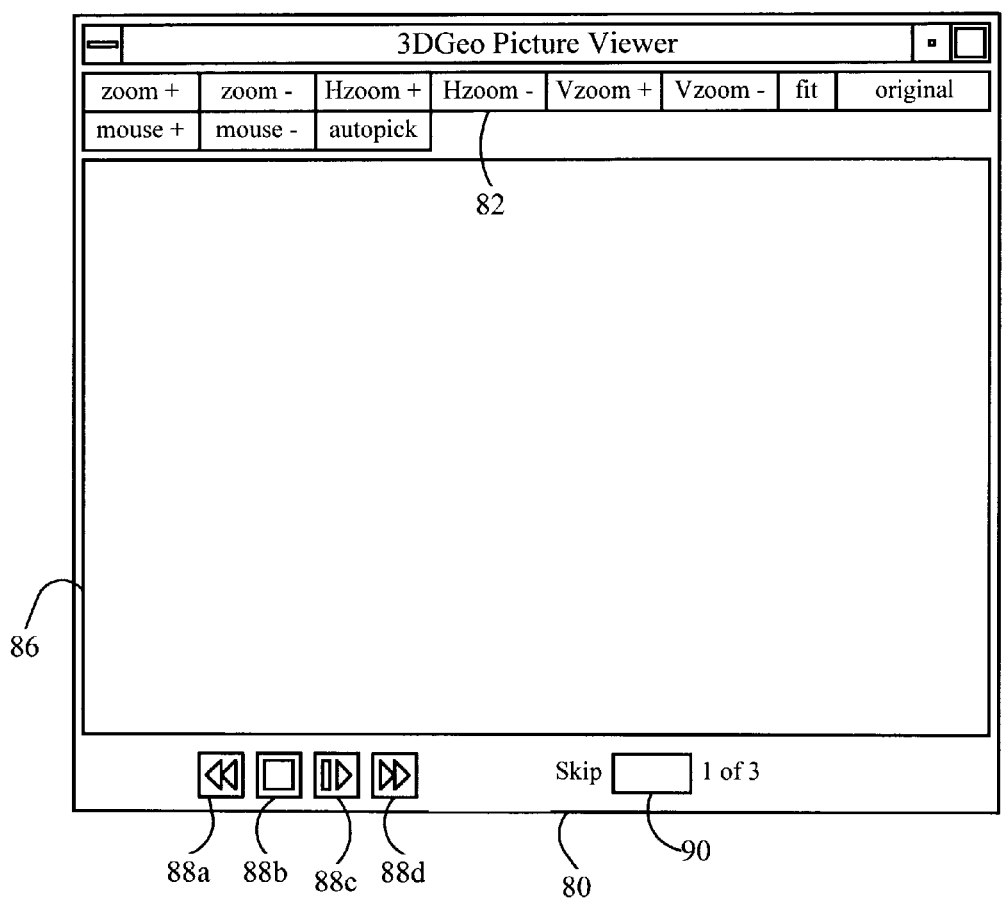
FIG. 7 illustrates a geophysical data viewer display according to the present invention.

To allow the user to visualize intermediate or final geophysical data processing results, client 24 comprises a data viewer capable of generating one or more data viewer windows. FIG. 7 illustrates a data viewer window 80 suitable for use in the present invention. Window 80 includes plural display control buttons 82 allowing the user to customize the display of geophysical data within a display panel 86. Window 80 further includes plural browsing control buttons 88a-d for controlling the identity of data displayed within panel 86. Display panel 86 is capable of sequentially displaying 2-D slices of a 3-D data set.

Upon user request through display control buttons 82, the data viewer is capable of zooming the displayed geophysical image along one or two display axes, redimensioning the image to fit panel 86 after a window resize, restoring the image to its original size, and changing the mouse sensitivity. The data viewer further allows the user to manually pick a set of points or (x,y) coordinates by clicking on the image displayed within panel 86. Upon user request through display control buttons 88a-d, the data viewer is capable of advancing or reversing the image displayed in panel 86 in a sequence of images. The user can also skip to a desired image in the sequence by entering a value in a browsing control field 90.

After reviewing an intermediate result in data viewer window 80, a user operating client 24 can stop a flow running on server 22, and modify parameter values or other flow characteristics for subsequent flow execution on server 22. The user can stop a flow running on server 22 from a flow builder display such as window 50 shown in FIG. 4-A. Since typical flows can take days to weeks to execute to completion, the ability to stop the flow execution preemptively after observing that preliminary results are not satisfactory can save valuable processing time and computational resources.

The present invention further provides articles of manufacture containing computer-readable media storing instructions for executing methods of the present invention. Further provided are computer systems for implementing methods of the present invention.

The above-described systems and methods allow geologists to have direct control of depth-imaging projects and to have access to remote large-scale parallel computers. By enabling remote access to large shared computer facilities, the present invention allows overcoming the economical and operational obstacles that today prevent the vast majority of exploration projects in difficult areas to fully benefit from the rapid progress in high-performance computing.

The required large-scale computational facilities are accessed through the wide-area networks that are being developed and deployed for both Internet and Intranets, such as Virtual Private Networks (VPN). Exploration companies can have access to almost unlimited computational power on demand, without the problem of amortizing the huge fixed cost of the required facilities. These facilities will be cost-effectively managed by either service companies or central departments of major oil companies. The increased availability of computing power will improve the success-ratio of a large number of exploration projects, considerably enhancing the U.S. and world oil & gas supply.

Furthermore, new or updated geophysical processing modules or seismic interpretation packages can be integrated with the above-described graphical user interface without manually coding the user data entry window corresponding to each module. Seismic interpretation packages can include hundreds or thousands of modules. In turn, each module can require the entry of values for multiple parameters. Manually generating data entry windows for such large numbers of modules would be a large barrier to the integration of such packages with a new graphical user interface.

It will be clear to one skilled in the art that the above embodiments may be altered in many ways without departing from the scope of the invention. Accordingly, the scope of the invention should be determined by the following claims and their legal equivalents.

What is claimed is:

1. A computer-implemented remote data processing method comprising: building a data processing flow description on a client connected to a data processing server over a wide area network, the flow description including an identification of at least one of a plurality of data processing modules; determining a user-data entry requirement for the at least one of a plurality of data processing modules by parsing an input source file for the at least one of a plurality of data processing modules; generating a data-entry display on the client according to a display customization file for the at least one of the plurality of modules, the data-entry display allowing for editing of parameter values that control the execution of the at least one of the plurality of modules; transferring the data processing flow description from the client to the data processing server over the wide area network; running the data processing flow on the data processing server, utilizing the user-data entry requirements to generate an intermediate result of data processing performed on a data set, wherein the intermediate result comprises a 3-D array of data; accessing at least part of the intermediate result over the wide area network for evaluating the intermediate result; stopping the running of the data processing flow over the wide area network, according to the intermediate result and before a final result of the data processing is generated; modifying the data processing flow according to the intermediate result; and restarting the data processing flow using the modifications.

2. The method of claim 1, further comprising performing each of the steps of claim 1 for each of a plurality of data processing flows.

3. The method of claim 1, wherein the input source file comprises substantially an entire source code of at least one of the plurality of data processing modules.

4. The method of claim 1, wherein the steps of determining the user data-entry requirement and employing the module to process the data set are performed on a server and the step of generating the data-entry display is performed on a client remotely connected to the server over a wide area network.

5. The method of claim 1, comprising generating the data entry display according to data entry display customization data corresponding to the user.

6. The method of claim 1 further comprising the steps of generating a display of a process flow that includes an ordered sequence of data processing modules selected by the user and employing the process flow to process the data set.

7. The method of claim 1, further comprising a step of displaying an image resulting from processing the data set.

8. A computer-implemented data processing method comprising: building a data processing flow description on a client connected to a data processing server over a wide area network, the flow description including an identification of at least one of a plurality of data processing modules and the building including customizing a set of parameters for the at least one of the plurality of data processing modules; determining a user-data entry requirement for the at least one of a plurality of data processing modules by parsing an input source code for the at least one of a plurality of data processing modules; transferring the data processing flow description from the client to the data processing server over the wide area network; running the data processing flow on the data processing server utilizing the user-data entry requirements, the data processing flow generating an intermediate result of data processing performed on a data set, wherein the intermediate result comprises a 3-D array of data; accessing at least part of the intermediate result over the wide area network for evaluating the intermediate result; stopping the running of the data processing flow over the wide area network, according to the intermediate result and before a final result of the data processing is generated; modifying the data processing flow according to the intermediate result; restarting the data processing flow using the modifications; and restricting access to the flow and intermediate result to an authorized workgroup.

9. The method of claim 8, wherein the flow comprises a concatenation of at least two of the plurality of data processing modules.

10. The method of claim 9, wherein the flow description comprises an ordered list of the at least two of the plurality of data processing modules.

11. The method of claim 10, wherein the flow description further comprises a set of user-entered parameters for the at least two of the plurality of data processing modules.

12. The method of claim 8, wherein the flow description further comprises a set of user-entered parameters for the at least one of the plurality of data processing modules.

13. The method of claim 8, wherein building the data processing flow description comprises: generating a user data-entry display according to the data entry requirement for requesting a set of input parameter values from a user; accepting the set of input parameter values from the user; and transferring the input parameter values to the server.

14. A computer-implemented client method for data processing, comprising performing the following steps on a client remotely connected to a data processing server over a wide-area network: configuring a description of a data processing flow for transmission to the server, the description including an identification of at least one of a plurality of data processing modules; determining a user-data entry requirement for the at least one of a plurality of data processing modules by parsing an input source code for the at least one of a plurality of data processing modules; receiving user input related to the user-entry requirement for configuring one or more parameters utilized during execution of the data processing flow; executing the data processing flow; accessing at least part of an intermediate result generated by applying the data processing flow to a data set on the server for evaluating the intermediate result, wherein the intermediate result comprises a 3-D array of data; instructing an ending of the processing in response to the evaluation of the intermediate result before a final result of the processing is generated; modifying the parameters utilized during execution of the data processing flow; and instructing re-starting processing using the modified parameters.

15. A computer-implemented server method for data processing, comprising performing the following steps on a data processing server remotely connected to a client over a wide-are network: receiving configuration data describing a data processing flow, the configuration data including an identification of at least one of a plurality of data processing modules; determining a user-data entry requirement for the at least one of a plurality of data processing modules by parsing an input source code for the at least one of a plurality of data processing modules; receiving input from a user according to the user-data entry requirement; employing the data processing flow with the received input to generate an intermediate result by processing a data set, wherein the intermediate result comprises a 3-D array of data; transmitting at least part of the intermediate result to the client; stopping the processing in response to a client request received subsequently to transmitting the at least part of the intermediate result and before a final result of the processing is generated; and resuming processing in response to receiving a client request to re-start processing.

16. An article of manufacture including a non-transitory computer-readable storage medium containing instructions for executing a method comprising the following steps on a client remotely connected to a data processing server over a wide-area network: configuring a description of a data processing flow for transmission to the server, the description including an identification of at least one of a plurality of data processing modules; determining a user-data entry requirement for the at least one of a plurality of data processing modules by parsing an input source code for the at least one of a plurality of data processing modules; receiving user input related to the user-entry requirement, the input comprising one or more parameters; executing the data processing flow utilizing the one or more parameters; accessing at least part of an intermediate result generated by applying the data processing flow to a data set on the server for evaluating the intermediate result, wherein the intermediate result comprises a 3-D array of data; instructing an ending of the processing in response to the evaluation of the intermediate result before a final result of the processing is generated; modifying at least one of the one or more parameters utilized in execution of the data processing flow; and instructing re-starting processing using the modified at least one of the one or more parameters.

17. An article of manufacture including a non-transitory computer-readable storage medium containing instructions for executing a method comprising the following steps on a data processing server remotely connected to a client over a wide-area network: receiving configuration data describing a data processing flow, the description including an identification of at least one of a plurality of data processing modules; determining a user-data entry requirement for the at least one of a plurality of data processing modules by parsing an input source code for the at least one of a plurality of data processing modules; employing the data processing flow to generate an intermediate result by processing a data set, wherein the intermediate result comprises a 3-D array of data; transmitting at least part of the intermediate result to the client; stopping the processing in response to a client request received subsequently to transmitting the at least part of the intermediate result and before a final result of the processing is generated; modifying the data processing flow according to the intermediate result; and resuming processing in response to receiving a client request to re-start processing.

18. A computer-implemented data processing method comprising: generating a display of a data processing workgroup including a set of projects and a set of data processing modules, each project including at least one data set and at least one processing flow and the at least one processing flow including a concatenation of data processing modules; in response to a user selection of the at least one processing flow from the display of the workgroup, generating a display of the concatenation of data processing modules of the at least one processing flow; in response to a set of flow editing user commands, modifying the at least one processing flow; after modifying, sending a description of the at least one processing flow to a data processing server over a wide area network; determining a user-data entry requirement for the at least one of a plurality of data processing modules by parsing an input source file for the at least one of a plurality of data processing modules; accepting a set of parameter values specified by the user-data entry requirement for at least one of the set of data processing modules of the processing flow; sending the set of parameter values to the server over the wide area network; directing an execution of the processing flow on the server, employing the set of parameter values; employing the processing flow to generate an intermediate result by processing the set of parameter values, wherein the intermediate result comprises a 3-D array of data; transmitting at least part of the intermediate result to the user; stopping the processing flow in response to a user request received subsequently to transmitting the at least part of the intermediate result and before a final result of the processing flow is generated and resuming processing in response to receiving a user request to re-start processing; and retrieving a result of the execution for visualization.

19. The method of claim 18 wherein the representation of the workgroup is a tree structure representation.

20. The method of claim 18 wherein accepting the set of parameter values from the user comprises automatically generating a data entry display by the parsing of the input source file of the at least one module.

21. A computer-implemented data processing method comprising: building a data processing flow description on a client connected to a data processing server over a wide area network, the data processing flow description including an identification of at least one of a plurality of data processing modules; determining a user-data entry requirement for the at least one of a plurality of data processing modules by parsing an input source code for the at least one of a plurality of data processing modules; generating a data-entry display according to a display customization file for the at least one of the plurality of data processing modules, wherein the data-entry display allows for editing of one or more parameter values that control the execution of the at least one of the plurality of modules; receiving user input for the one or more parameter values; transferring the data processing flow description from the client to the data processing server over the wide area network; running the data processing flow description on the data processing server utilizing the edited one or more parameter values, the data processing flow generating an intermediate result of data processing performed on a data set, wherein the intermediate result comprises a 3-D array of data; accessing at least part of the intermediate result over the wide area network for evaluating the intermediate result; stopping the running of the data processing flow over the wide area network, according to the intermediate result; modifying the data processing flow according to the intermediate result; and resuming processing in response to receiving a client request to re-start processing.

22. The method of claim 21, wherein the flow comprises a concatenation of at least two of the plurality of data processing modules.

23. The method of claim 22, wherein the flow description comprises an ordered list of the at least two of the plurality of data processing modules.

24. The method of claim 23, wherein the flow description further comprises a set of user-entered parameters for the at least two of the plurality of data processing modules.

25. A computer-implemented data processing method comprising: establishing a plurality of workgroups, each workgroup corresponding to a customer from a plurality of data processing customers; for said each workgroup, establishing a data processing flow on a data processing server, the data processing flow including at least one of a plurality of modules, a user-entry requirement for the at least one of a plurality of data processing modules being determined by parsing an input source code for the at least one of a plurality of data processing modules; receiving user input as parameters satisfying the user-entry requirement; executing the data processing flow to generate an intermediate result of data processing performed on a data set, wherein the intermediate result comprises a 3-D array of data; accessing the intermediate result from a client connected to the server over a wide-area network for evaluating the intermediate result; stopping the execution of the data processing flow over the wide-area network, according to the intermediate result; modifying the data processing flow by accepting from the user a set of parameter values for at least one module of the flow, based on the intermediate result; and resuming processing in response to receiving a client request to re-start processing.

26. A data processing apparatus comprising: building a data processing flow description on a client connected to a data processing server over a wide area network, the flow description including an identification of at least one of a plurality of data processing modules and the data processing server comprising a non-transitory computer readable medium; determining a user-data entry requirement for the at least one of a plurality of data processing modules by parsing an input source file for the at least one data processing module; generating a data-entry display according to a display according to the data entry requirement for requesting a set of input parameter values from a user; receiving one or more parameter values satisfying the user-data entry requirement; transferring the data processing flow description from the client to the data processing server over the wide area network; running the data processing flow on the data processing server utilizing the input of one or more parameter values, the data processing flow generating an intermediate result of data processing performed on a data set, wherein the intermediate result comprises a 3D-array of data; accessing at least part of the intermediate result over the wide area network, for evaluating the intermediate result; stopping the running of the data processing flow over the wide area network, according to the intermediate result; modifying the data processing flow according, to the intermediate result; and resuming processing in response to receiving a client request to re-start processing.

* * * * *